(12) United States Patent
Axelrod et al.

(10) Patent No.: US 7,691,426 B2
(45) Date of Patent: Apr. 6, 2010

(54) ANIMAL CHEW COMBINING EDIBLE RESIN AND RAWHIDE

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 837 days.

(21) Appl. No.: 11/423,389

(22) Filed: Jun. 9, 2006

(65) Prior Publication Data

US 2007/0289552 A1 Dec. 20, 2007

(51) Int. Cl.
*A01K 29/00* (2006.01)

(52) U.S. Cl. .................. 426/132; 426/646; 426/656; 426/658; 426/805; 119/710

(58) Field of Classification Search .................. 426/646, 426/805, 656, 658, 132; 119/710
See application file for complete search history.

(56) References Cited

U.S. PATENT DOCUMENTS

| | | | |
|---|---|---|---|
| 2,988,045 A | 6/1961 | Fisher | |
| 3,441,001 A * | 4/1969 | Fisher | 119/709 |
| 4,364,925 A | 12/1982 | Fisher | |
| 4,702,929 A | 10/1987 | Lehn et al. | |
| 5,011,679 A | 4/1991 | Spanier et al. | |
| 5,476,069 A | 12/1995 | Axelrod | |
| 5,635,237 A | 6/1997 | Greenberg et al. | |
| 5,673,653 A | 10/1997 | Sherrill | |
| 5,894,029 A | 4/1999 | Brown et al. | |
| 5,897,893 A | 4/1999 | Mohilef | |
| 6,165,474 A | 12/2000 | Frudakis et al. | |
| 6,202,598 B1 * | 3/2001 | Willinger | 119/709 |
| 6,277,420 B1 | 8/2001 | Andersen et al. | |
| D472,682 S | 4/2003 | Tepper et al. | |
| D476,118 S | 6/2003 | Kirch | |
| D477,693 S | 7/2003 | Kirch | |
| D477,695 S | 7/2003 | Kirch | |
| 6,584,938 B2 | 7/2003 | Sherrill et al. | |
| 6,586,027 B2 * | 7/2003 | Axelrod et al. | 426/132 |
| D479,369 S | 9/2003 | Kirch | |
| D503,506 S | 4/2005 | Tepper et al. | |
| D505,533 S | 5/2005 | Jia et al. | |
| 6,886,496 B1 | 5/2005 | Brown | |
| 6,895,900 B2 * | 5/2005 | Hingst | 119/710 |
| 7,025,020 B2 | 4/2006 | Brown | |
| 7,087,260 B2 | 8/2006 | Axelrod | |
| 2004/0126462 A1 | 7/2004 | Tepper et al. | |
| 2004/0137118 A1 | 7/2004 | Axelrod | |
| 2005/0013898 A1 | 1/2005 | Stookey | |
| 2005/0013899 A1 | 1/2005 | Kostlan et al. | |
| 2005/0084563 A1 | 4/2005 | Cupp et al. | |
| 2006/0105025 A1 | 5/2006 | Hill et al. | |

OTHER PUBLICATIONS

Webpages from internet archives dated Sep. 30, 2004 downloaded from http://web.archive.org/web/*/http://www.poochietreats.com/, 5 pages.*
Doctors Foster & Smith Educational Staff. Foster & Smith, Inc. 2253 Air Park Road, P.O. Box 100, Rhinelander, Wisconsin 54501-Copyright © 1997-2006. "Rawhide Bones: Bone-Up on Rawhide Benefits". www.drsfostersmith.com/pic/article.cfm?aid=450. Printout date Mar. 27, 2006. 2 pgs.
http://www.dog-bones.com/rawhide_bones.html. Dog Bones-Rawhide bones-rawhide chew treats-dog rawhides-What are they? Where do they come from? How are they made? "Rawhide Bones and Treats for Dogs." Printout date Sep. 29, 2006. 6 pgs.

* cited by examiner

*Primary Examiner*—C. Sayala
(74) *Attorney, Agent, or Firm*—Grossman, Tucker, Perreault & Pfleger PLLC

(57) ABSTRACT

The present invention relates to providing an animal chew formed of rawhide and edible resin. The edible resin may be positioned on the outer surface of the rawhide and/or retained within the rawhide. The edible resin may include one or a mixture of starch, gluten, vegetable protein, carbohydrate or fat.

11 Claims, 6 Drawing Sheets

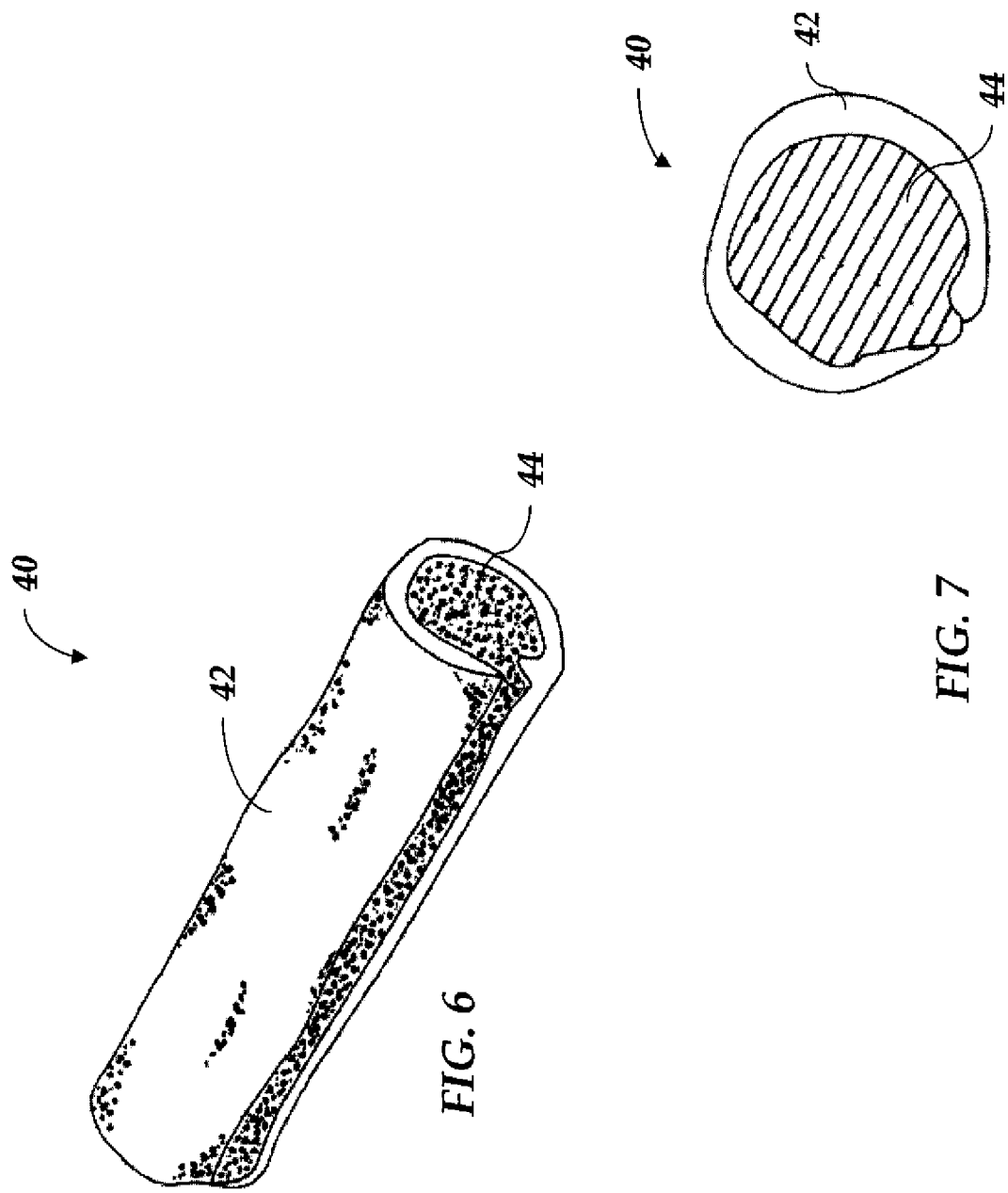

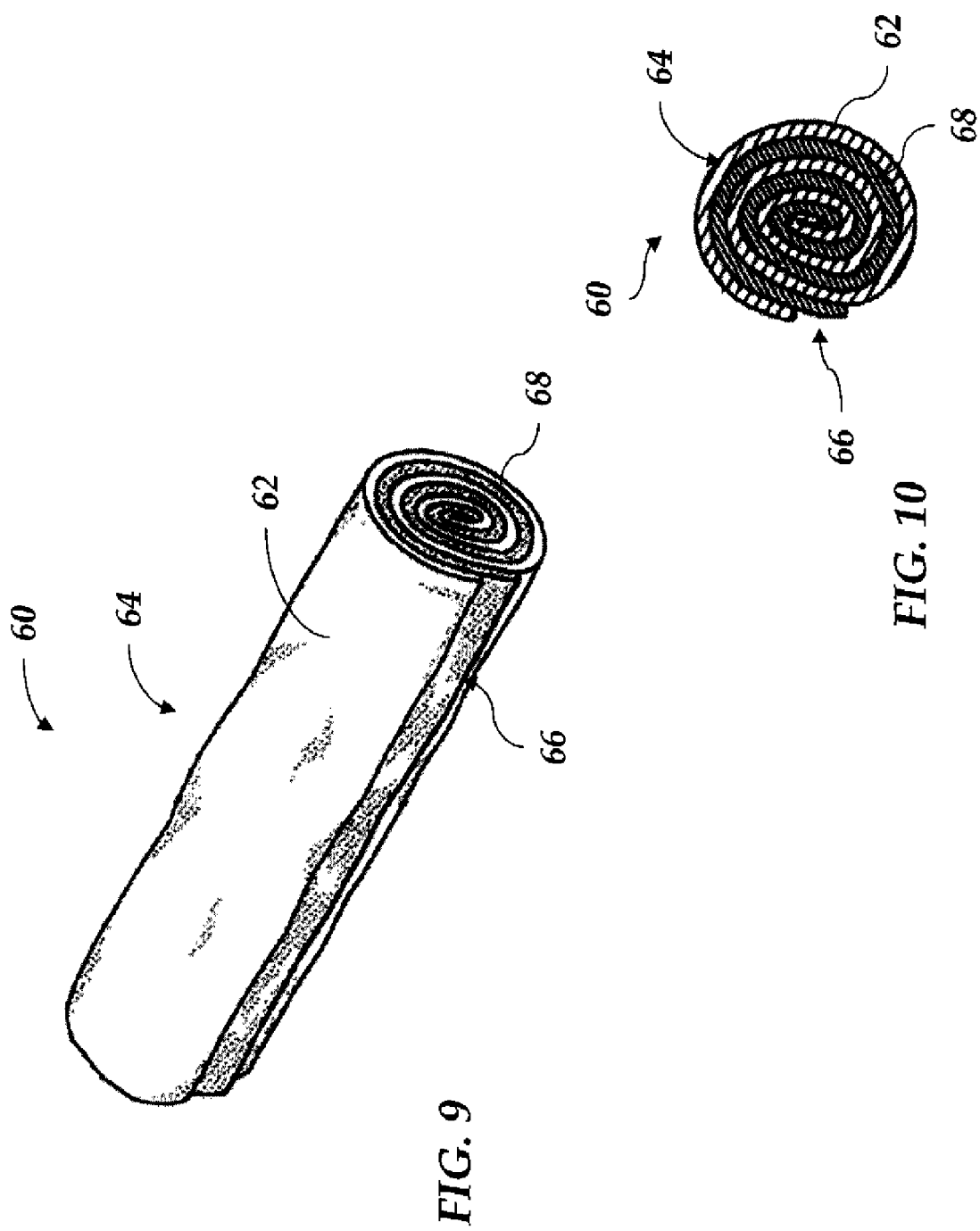

ANIMAL CHEW COMBINING EDIBLE RESIN AND RAWHIDE

FIELD OF INVENTION

The present invention relates to chew toys and a method of making thereof which incorporate an edible resin and rawhide. In particular, the edible resin may include a starch based resin or a gluten based resin. The resin may surround all or a portion of the rawhide or may be at least partially or fully retained within the rawhide.

BACKGROUND

It is well recognized that animals, such as dogs, have a natural desire to chew. Chewing may provide a number of benefits, including cleaning action for teeth and exercise for gums. Chewing may also reduce the bacteria that may be present in an animal's mouth which may aide in reducing infections, kidney disease or heart disease. In addition, plaque and calculus, which are mineralized deposits of plaque formed on the tooth surface, may be reduced by the abrasive action of chewing. Furthermore, by reducing bacteria, plaque and calculus, gum disease may be decreased reducing the incidence of bad breath.

A variety of pet chews have been developed to help satisfy the chewing needs of animals. Pet chews have also been developed that may supply vitamins and nutrients to pets, augmenting healthy feeding regimes. These chews range in size, shape, materials and colors. However, there is still a need to provide pet chews that satisfy both the chewing requirements of a pet and augment nutritional feeding regimes.

SUMMARY

In one exemplary embodiment, the present invention relates to an animal chew comprising rawhide and an edible resin. The edible resin may include any form of starch gluten or any other vegetable based protein. The edible resin may also include a carbohydrate or fat based product. All or a portion of the edible resin may retained by the rawhide. The edible resin may also be applied to all or a portion of the exterior of the rawhide.

In another exemplary embodiment, the present invention relates to a method of forming an animal chew comprising providing rawhide and providing an edible resin composition. The edible resin composition may again include starch, gluten, vegetable based protein, carbohydrate or fat based product. This may then be followed by forming the edible resin composition and rawhide into a selected shape.

BRIEF DESCRIPTION OF THE DRAWINGS

Features and advantages of the present invention are set forth herein by description of embodiments consistent with the present invention, which description should be considered in conjunction with the accompanying drawings, wherein:

FIG. 6 is another exemplary embodiment of a pet chew of the present invention.

FIG. 7 is an exemplary embodiment of a cross-sectional view of the pet chew in FIG. 6.

FIG. 9 is another exemplary embodiment of a pet chew of the present invention.

FIG. 10 is an exemplary embodiment of a cross-sectional view of the pet chew in FIG. 9.

DETAILED DESCRIPTION

Figure 2:
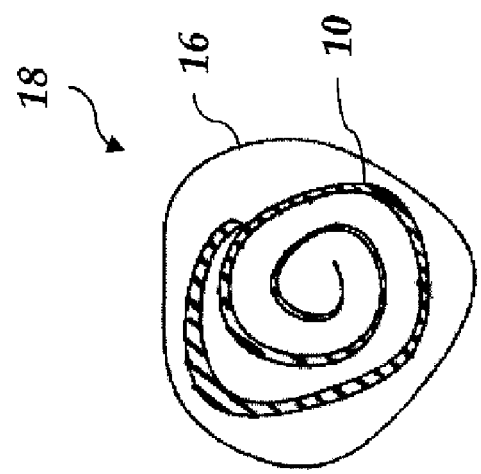
FIG. 2 is an exemplary embodiment of a cross-sectional view of the pet chew in FIG. 1.

The present invention relates to a pet chew product which combines a rawhide and edible resin into a chew toy. The rawhide may be at least partially or completely surrounded by the edible resin. In addition, the edible resin may be partially or fully retained by the rawhide. The rawhide may provide an abrasive or flossing action while the pet is chewing on the chew toy and the edible resin may provide nutritional supplementation.

The edible resin may include one or more of a starch, gluten, vegetable based protein, a carbohydrate or fat as well as mixtures thereof. Accordingly, the edible resin may contain a mixture of, e.g., starch, gluten, carbohydrate and/or a fat. For example, the edible resin may contain 25% (wt) starch, 25% (wt) gluten, 25% (wt) carbohydrate and 25% (wt) fat. However, any and all values of such components may be employed, wherein the components may be present in any value or range at about 1-99% (wt). Accordingly, the edible resin may contain 50% (wt) gluten, 25% (wt) starch, 15% (wt) carbohydrate and 10% (wt) fat. It may also contain 75% (wt) gluten, with the remaining 25% (wt) distributed over the other identified edible sources. Those skilled in the art will therefore appreciate other potential values and ranges. Accordingly, any one of the ingredients (starch, gluten, vegetable based protein, fat) may be present as a major ingredient (50% (wt) or greater) and the other components may be present at less than 50% (wt).

The rawhide and/or edible resin may be formed into any desired shape which may be facilitated by the use of heat. For example, the forming may involve processes such as injection molding, extrusion and/or compression molding or rotational molding. In addition, the forming may be accomplished by any type of mold, die (e.g. extrusion die) or other shaping device.

The rawhide may be obtained from the hide of an animal such as buffalo, sheep, goats, marsupial, pig, deer, elk, or cattle. The hide is not exposed to tanning and may be devoid of all fur, meat and fat. Initially the hide may contain between 60 to 80% by weight water and 20 to 40% by weight other substances such as fibrous proteins, collagen, keratin, elastin and reticulin. Also between 0.01 to 2% by weight ash may be present wherein the ash may include phosphorous, potassium, sodium, arsenic, magnesium and calcium.

Generally, a hide may be prepared by any method known to those of ordinary skill in the art. One such exemplary method may include removing most of the visible fat and meat from the hide. Once the fat and meat is removed the hide may be treated in a solution of calcium carbonate or calcium hydroxide, which may loosen and aid in the removal of hair. In addition, sodium sulphide, ammonium salts or enzymes may be added to the solution. The hair may then be removed from the hide and the hide may be rinsed. The hide may then be soaked in an aqueous solution including organic acids, inorganic acids and/or acid salts, such as potassium hydrogen tartrate and sodium bicarbonate. The hide may be rinsed again forming rawhide pieces, which may assume the shape of sheets. The pieces of rawhide may be dried or further processed wet. In addition, the pieces may be soaked in a solution including hydrogen peroxide and chlorine.

In an exemplary embodiment, the rawhide may be provided as a rawhide resin composition, wherein the rawhide may be chopped or ground into small particles or powder. The particle size may be less than about 10 mm, such as in the range of 0.001 to 10 mm, including all values and increments therein. The rawhide moisture content may be adjusted to approximately 1-20% by weight of the rawhide, including all increments and values therein, such at 8%, 10%, etc.

The rawhide may then be combined with up to 20% by weight of casein, such as in the range of about 0.1 to 20% by weight, including all values and increments therein. Caesin may be understood as a phosphoprotein of milk, wherein a phosphoprotein may be described as a group of substances that are chemically bonded to a substance containing phosphoric acid. The rawhide may also be combined with gelatin up to 10% by weight, such as in the range of 0.1 to 10% by weight, including all values and increments therein. Gelatin may be understood as a protein product produced by partial hydrolysis of collagen. In addition, attractants, such as flavorants, or nutrients may be compounded with the rawhide.

The rawhide particles may be melt processed, wherein the particles are plasticated in a plasticating device. Suitable plasticating devices may include injection molding machines, extruders (twin-screw, single screw, etc.) or any other device which may provide sufficient thermal-mechanical interaction to cause plastication, such as blenders. The temperature of the plasticating device may be sufficient to melt at least 10% to 100% of the particles, including all values and increments therein and may be in the range of about 120 to 150° C., including all values and increments therein. In addition, the particles may be pressurized during plastication wherein the applied pressure may be in the range of about 1 to 20 MPa, including all values and increments therein. For example, back pressure may be applied during injection molding.

Once plasticated, the rawhide may be formed to a desired shape, such as a sheet, strips or a formed article, by an extruder die, an injection mold cavity, etc. The rawhide may also be pelletized for further processing. It should be appreciated that the casein, gelatin and other additives, i.e. attractants, flavoring or nutrients, may be added to the rawhide prior to or during plastication. In addition, moisture may be removed from the rawhide during plastication or after plastication. For example, the plastication device may be vented, such as by the use of vent ports in the plastication device. After plastication, the moisture may be removed by drying, such as drying in an oven or tunnel.

As alluded to above, the edible resin may include any starch or carbohydrate of natural or vegetable origin or gluten, such as wheat gluten. Exemplary starches may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassava, konjac, kudzu, oca, sago, sorghum, sweet potato, taro, yams, fava beans, lentils and peas. The starch may be present in the resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, as described above, which may be understood as milled and/or pre-sifted. It should be understood that the raw starch may also have varying degrees of moisture present. In one embodiment moisture may be present in the raw starch between 1-60%, including all increments and values therebetween such as 40%, 20%, 10%, etc. Accordingly, it should be appreciated that the term "direct" as used herein with respect to injection molding refers to the molding of resin (e.g. starch) without exposing the resin to prior thermal molding histories before injection molding. However, the resin (e.g. starch) herein may, e.g., be heated for drying purposes, which would not amount to a prior thermal molding history.

Gluten may be understood as water-insoluble protein complex extracted from cereal grains such as maize or corn and wheat. Accordingly, the present invention contemplates the use of a wheat gluten material either as the base resin or in combination with another edible resin, such as starch. The gluten may be composed of gliadin and glutenin. Again, as noted above, gluten may be present in the resin composition between about 1-99% including all increments and values therebetween, such as at levels above 50%.

The edible resin composition herein may be sourced from Manildra Group USA, under the following tradenames: "GEMSTAR 100," which is a refined food grade wheat starch; "GEMSTAR100+," which is a refined food grade wheat starch; "GEM OF THE WEST VITAL WHEAT GLUTEN," which is a powder product produced by low temperature drying of gluten extracted from wheat flour; "ORGANIC GEM OF THE WEST VITAL WHEAT GLUTEN," which is a powder product produced by low temperature drying of gluten extracted from organic wheat flour; "ORGANIC GEMSTAR 100," which is a wheat starch extracted from organic wheat flour; and/or "ORGANIC GEMGEL 100," which is a pregelatinized organic wheat starch. In addition, the resin composition may be sourced from ADM under the trade names "EDIGEL 100," which is a wheat resin composition, and "AYTEX P," which is an unmodified food grade wheat starch.

The edible resin (e.g. starch or gluten) may be of a controlled particle size, and may have a controlled level of moisture, so that the resin may be formed, upon exposure to one cycle of heat, into a desired shape. The resin may have a particle size distribution wherein all or a portion of the particles are less than about 2.0 millimeters (mm), or 2000 microns, including all ranges of particle size that may be below 2000 microns. For example, the resin particle size may be less than about 500 microns and any value or range between 500 microns and 1 micron, including less than 250 microns, less than 149 microns, less than 44 microns, etc. In one embodiment, approximately greater than 95% of the particles are less than 149 microns and approximately greater than 60% of the particles are less than 44 microns. In another embodiment, approximately greater than 97% of the particles are less than 250 microns, and approximately greater than 75% of the particles are less than 149 microns. The resin may also have a bulk density of between 30-50 lb/cubic foot, including all values and ranges therebetween such as between 40-45 lb/cubic foot, 38-40 lb/cubic foot, 35-38 lb/cubic foot, etc.

The resin may also include or be based upon cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the resin composition. The emulsifier may be present between about 1-10% by weight of the resin composition and all increments or values therebetween including 3%, 4%, etc. The emulsifier may include, for example, lecithin, which may be extracted or derived from egg yolk or soy beans.

The resin composition may also include a plasticizer. The plasticizer may include for example, glycerin. The plasticizer may be incorporated between about 15-30% by weight, including all increments and values therebetween such as levels greater than 15%, 21%, 27% etc.

A humectant may also be incorporated into the resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The resin composition may also include water. The water may be introduced into the composition between about 1-40% by weight of the resin composition and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The resin composition may include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc. The Soynatto® product may provide proteins, minerals, and vitamins, in a fermented soy form. The fermentation process may infuse the product with *saccharomyces cerevisiae*, commonly known as "bakers yeast" or "brewers yeast." *Saccharomyces cerevisiae* is more traditionally known to ferment sugars present in flour or dough, yielding carbon dioxide and alcohol. Accordingly, it should be appreciated that a protein, one or more of a mineral, and one or more of a vitamin, along with *saccharomyces cerevisiae* may be present in the resin composition.

The fermented soy product herein may also include increased concentrations of glycitein, daidzein and genistein, reportedly present at several hundred percent more than other more common soyfood sources. Glycitein, daidzein and genistein belong to the isoflavone class of flavanoids and may be classified as phytoestrogen, since they are plant derived nonsteriodal compounds that contain estrogen-like biological activity.

The resin composition may also include enzymes and/or co-enzymes which are similarly available through Bio Foods, Ltd., Pine Brook, N.J. and sold under the trademark of BT-CoQ10® This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

Reportedly, the coenzyme Q10 is a fat-soluble compound primarily synthesized by the body and also consumed in the diet and is required for mitochondrial ATP synthesis. The fermented coenzyme also reportedly belongs to the family of compounds known as ubiquinones, which are either of two isomeric cyclic crystalline compounds $C_6H_4O_2$ that are diketo derivatives of dihydro-benzene. It may also function as an antioxidant in cell membranes and lipoproteins.

Other additives may be introduced into the composition as well. These additives may include vegetable matter, fruit matter, rawhide, nuts, nut bits or nut flour such as peanut flour, and animal or fish products, by-products, meal or digests, etc. By animal digest it is understood to include a substance made by taking relatively clean and relatively undecomposed animal tissue and breaking it down utilizing chemical or enzymatic hydrolysis. Preferably, the animal digest is hydrolyzed liver, e.g., hydrolyzed poultry liver. The animal digests may be obtained from Applied Food Biotechnology Incorporated, O'Fallon, Mo., and sold under the trade name Optimizor®. These additives may be present individually or cumulatively between about 0.1-50% by weight of the resin composition and all increments and values therebetween including 0.1-5.0%, 15%, 25%, etc.

Additionally, flavorants, herbs, herbal extracts, vitamins, minerals, colorants, yeast products, soy products, attractants, etc., may be incorporated into the resin composition. Yeast products may include nutritional yeast or brewers yeast such as saccharomyces cerevisiae, dairy yeast such as *kluyveromyce marxianus* or wine yeast such as *saccharomyces fermentati*. The soy products may include fermented soy or other soy products, such as miso pastep or tempeh. Attractants may include compounds listed herein, such as the animal or fish digests, or other compounds that may increase an animal's interest in the resin composition. These additives may be present individually or cumulatively between about 0.01-25% by weight of the resin composition and any increment or value therebetween including 0.01-0.5%, 10%, 20%, etc. The composition may also include calcium carbonate. The calcium carbonate may be present between about 5-10%.

The edible resin may be compounded by melt mixing or blending. Once compounded, the resin may be formed into a desired shape, such as sheet, strips, cylinders, etc. It should be appreciated that the compounding and forming processes may occur in separate steps or at the same time. For example, the ingredients may be fed into an injection molding machine or into an extruder, mixed and plasticated through rotation of a screw and formed upon injection into a cavity or passage through an extruder die. In another embodiment, the ingredient may be fed into a twin screw extruder or a blender, compounded and either pelletized for subsequent processing or formed through a die into the desired shape. In a further embodiment, the ingredients may be compounded in a blender or mixer and then the compounded resin may be fed into a molding machine, wherein it is plasticated.

In addition, moisture, including water, may be removed from the resin composition during processing. For example, a vented barrel may be provided in an extruder or injection molding machine. The moisture content may also be reduced by introducing the product into an oven, dryer, cooling tunnel, etc. However, it should be appreciated that it may be desirable that the resin contain sufficient moisture to allow the resin to be formed into and with the rawhide and then once formed both the resin and rawhide may be dried.

In one exemplary embodiment, the edible resin and the rawhide resin composition may be blended and injection molded together to form what may be described as a composite product. In this situation, the rawhide and edible resin may be present at respective levels of 1-99% (wt) and 99-1% (wt). In addition, the concentration of any of the above referenced additives, such as the nutritional additives, may be varied as desired to provide a desired level of nutritional supplementation.

Figure 1:
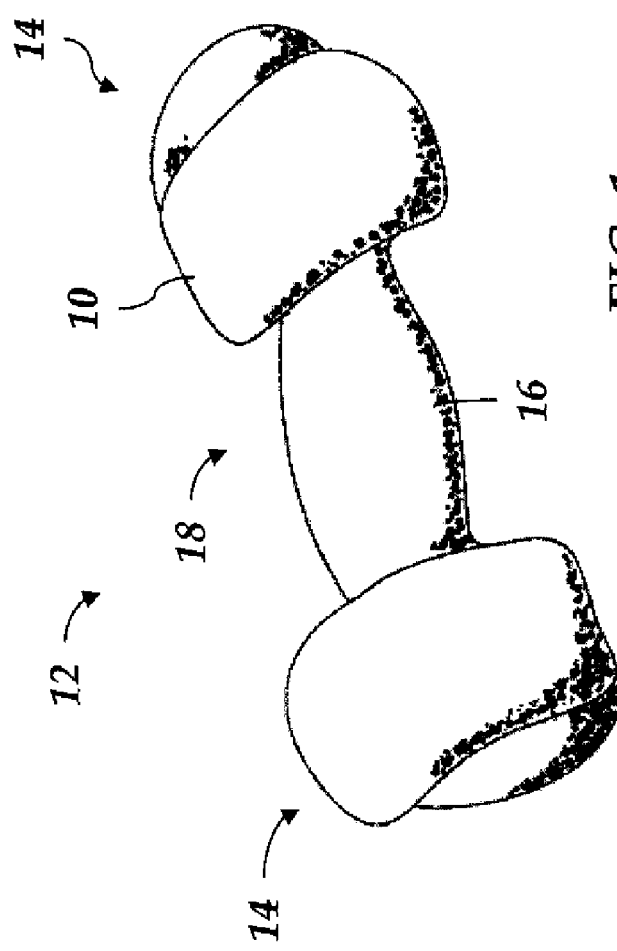
FIG. 1 is an exemplary embodiment of a pet chew of the present invention.
Figure 3:
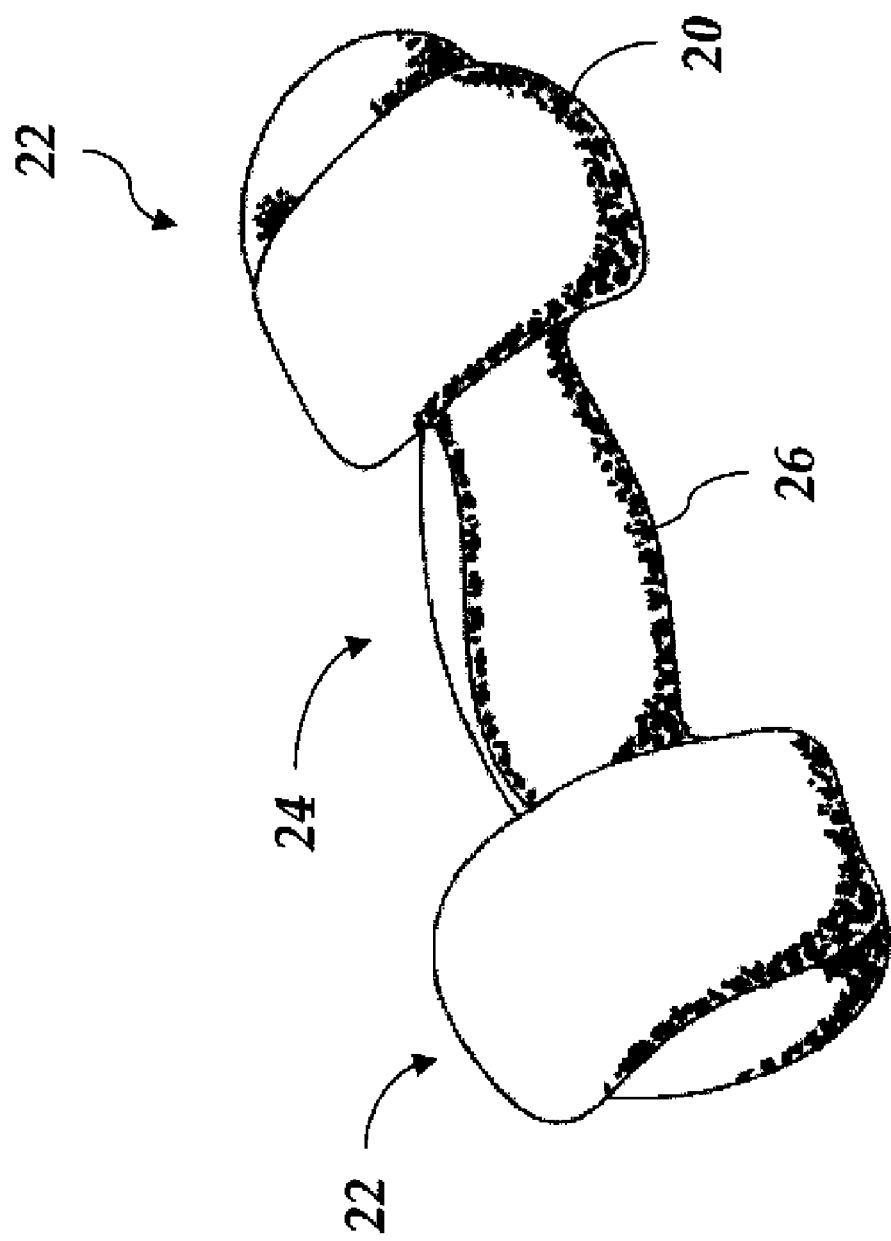
FIG. 3 is another exemplary embodiment of a pet chew of the present invention.

In addition, the edible resin may be molded, e.g. injection molded or over extruded or over-molded directly onto a rawhide material. In this manner it is contemplated that the edible resin may be made to assume the shape of the rawhide as an outer layer which may partially or complete surround the rawhide and/or cover the rawhide at any selected location. In addition, the edible resin may be selectively thickened at one or more desired locations on the rawhide material. For example, as illustrated in FIGS. 1 and 2, depicting an exemplary embodiment of the present invention and a cross-sectional view thereof, rawhide 10 may be in the shape of a bone 12 with knuckle portions 14 and the edible resin 16 may be selectively injection molded over the region between the knuckles 18. Moreover, as illustrated in FIG. 3 the edible resin 20 may be injection molded over the knuckle portions 22 and the regions 24 between the knuckles 22 may provide exposed rawhide 26.

Furthermore, if the edible resin is provided in a given shape, and the rawhide is made into particulate rawhide (particles or powder as noted above) and such particulate rawhide may be injection molded about the edible resin, in the manner described above. Such processes may be understood to include over-molding via injection molding. It should also be appreciated that in over-injection molding or over-extrusion the resins may be formed simultaneously or sequentially.

Figure 4:
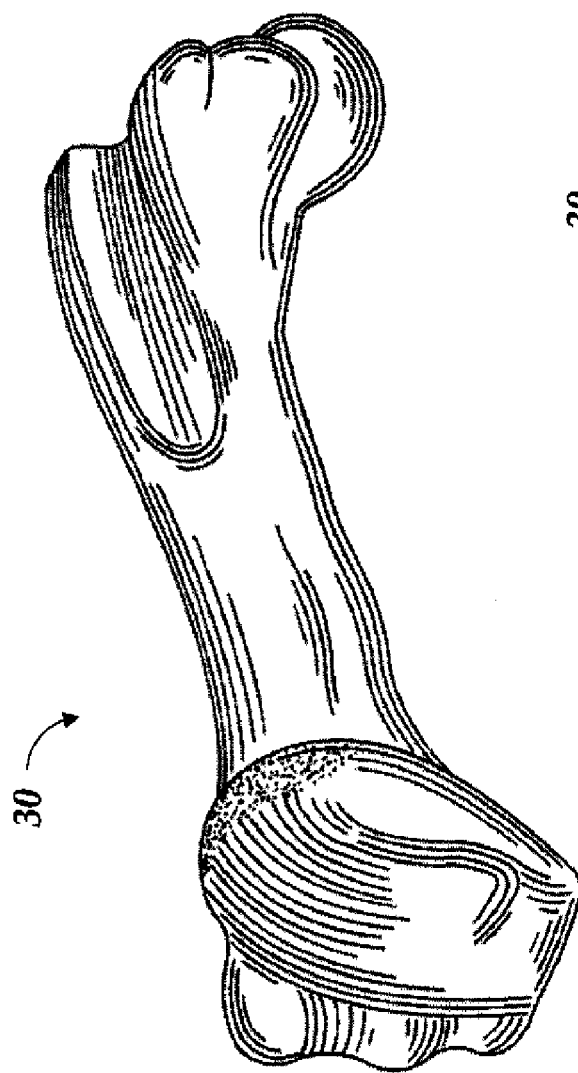
FIG. 4 is another exemplary embodiment of a pet chew of the present invention.
Figure 5:
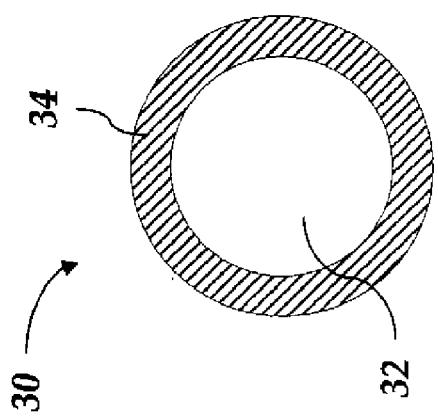
FIG. 5 is an exemplary embodiment of a cross-sectional view of the pet chew in FIG. 4.

Illustrated in FIGS. 4 and 5 is an exemplary embodiment and a cross-sectional view thereof, respectively, of an exemplary embodiment of an over-injection molded product 30. The figures illustrate the product assuming the shape of a bone wherein a first resin 32 is retained in a second resin 34. The first resin may be the rawhide and the second resin may be edible or alternatively, the first resin may be the edible resin and the second resin may be the rawhide. The overmolded product may take on a variety of shapes, such as a ring, a stick, people shapes, geometric shapes, or any shape that may be formed in a mold cavity. It should be appreciated that while, as illustrated, the second material encapsulates, that is completely surrounds the first material, this is not necessary and the first material may protrude or extend from the second material or selectively cover portions of the first material. Again, various over-molding techniques may be utilized such as insert molding, lost core molding, die-slide molding, gas assist injection molding, expandable/retractable core technology, etc.

Illustrated in FIGS. 6 and 7 is an exemplary embodiment of an over-extruded product 40. The illustrated product 40 may assume the shape of a bone. It may be composed of a first resin 42 and a second resin 44 protruding from the bone. The first resin 42 may assume the exterior shape of the bone and the second resin 44 may be retained partially or fully within the first resin. The first resin may be rawhide and the second resin may be an edible resin as contemplated herein. The resin melt flows may be joined together in a single extruder die or the flows may be joined once the resins have exited separate extruder dies. In addition, a first formed resin may be provided and the second resin may be extruded over the first formed resin, as alluded to above. Once again, the first resin may be either edible or rawhide resins and the second resin may be either edible or rawhide.

Figure 8:
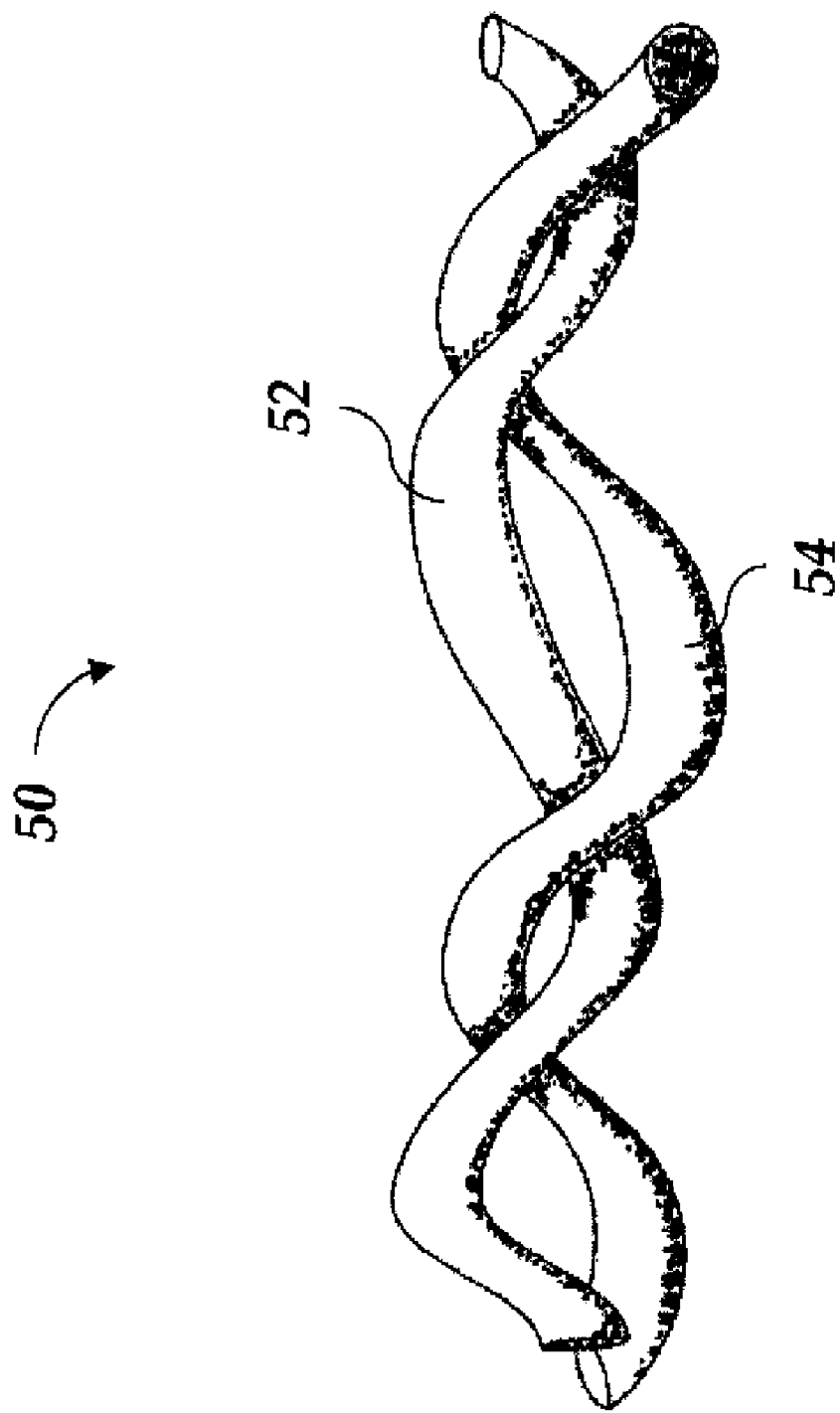
FIG. 8 is a further exemplary embodiment of a pet chew of the present invention.

In another exemplary embodiment, the edible resin and the rawhide resin composition may be formed into a twisted or braided product. For example, the edible resin and the rawhide resin may be separately extruded and twisted together to form a chew before the resins harden, i.e. before the resins are dried. Illustrated in FIG. 8 is an exemplary embodiment of a twisted rope 50 of a first resin 52 and a second resin 54. It should be appreciated that more than two strands may be used to form the rope and the strands may be twisted or braided in a variety of ways. In addition, in the case of multiple strands, any one or a plurality may be made of the edible resin, and any one or a plurality may be made from rawhide. The product may be produced, for example, by plasticating and/or compounding each material in a separate extruder barrel and formed via separate dies. Once the product exits the dies, the product may be twisted into a rope. In addition, once twisted or braided, the products may be formed into various shapes, such as sticks, rings or chains, prior to drying.

In a further exemplary embodiment the rawhide may be provided as a formable sheet product, without having been formed into a resin composition. The edible material may also be formed into a sheet, for example by extrusion, and have sufficient moisture to provide a malleable sheet. The two sheets may be folded, twisted or rolled together to form a desired product.

Illustrated in FIGS. 9 and 10 is another exemplary embodiment of a product 60 assuming the shape of a dog bone and a cross-sectional view thereof formed by at least one sheet of rawhide and at least one sheet of edible resin rolled together. As illustrated, the edible resin 62 may be present at the outer surface 64 of the bone. A portion 66 of the rawhide 68 may be exposed at the outer surface of the product 60. It should be appreciated that the configuration may be reversed wherein the rawhide may be present at the outer surface and the edible resin may be partially retained in the rawhide and protrude therefrom. In addition, in certain embodiments, the material present at the outer surface may completely surround the other material wherein the portion 64 may not be visible. Although not illustrated, the product 60 may have at least one knot tied in the product 60.

The foregoing description is provided to illustrate and explain the present invention. However, the description hereinabove should not be considered to limit the scope of the invention set forth in the claims appended here to.

What is claimed is:

1. A method of forming an animal chew having an exterior, comprising:
   providing rawhide;
   providing an edible resin composition wherein said edible resin comprises starch or gluten;
   forming said edible resin composition and rawhide into a selected shape, said selected shape comprising at least one layer of each of said edible resin and said rawhide in alternating order, wherein either or both of said rawhide and said edible resin form the exterior,
   wherein one of said edible resin and said rawhide is formed directly on the other.

2. The method of claim 1 including forming said edible resin composition and rawhide in the presence of heat.

3. The method of claim 1 wherein said forming of said edible resin composition and rawhide comprises injection molding.

4. The method of claim 1 wherein said forming of said edible resin composition and rawhide comprises extrusion.

5. The method of claim 1 wherein said forming of said edible resin composition and rawhide comprises compression molding.

6. The method of claim 1 wherein said step of providing rawhide comprises providing rawhide particulate and heating and forming said rawhide particulate.

7. The method of claim 6 wherein said step of providing rawhide particulate comprises providing rawhide particles having a particle size of less than about 10 mm and a moisture content;

adjusting said moisture content of said rawhide in the range of about 1-20%; and melt processing said rawhide particles to form said rawhide particulate.

8. The method of claim 1 wherein said step of providing an edible resin composition comprises:

combining said starch or said gluten, wherein said starch or said gluten is present between about 1-99% by weight in said edible resin composition with water present between about 1-40% by weight of said edible resin composition; and melt mixing said starch or said gluten and said water.

9. The method of claim 1 wherein said rawhide is malleable and said step of heating and forming said edible resin comprises twisting said edible resin composition with said rawhide.

10. The method of claim 1 further comprising the step of knotting said rawhide to form at least one knuckle.

11. The method of claim 9 wherein said edible resin is formed around said at least one knuckle.

* * * * *